United States Patent
Morgan et al.

(10) Patent No.: US 7,512,121 B1
(45) Date of Patent: Mar. 31, 2009

(54) T1 GROOMING TRANSLATION OF YELLOW ALARMS

(75) Inventors: Jason N. Morgan, Brownsboro, AL (US); Andrew T. Ruble, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 616 days.

(21) Appl. No.: 11/060,866

(22) Filed: Feb. 18, 2005

(51) Int. Cl.
 *H04L 12/50* (2006.01)
 *H04J 3/06* (2006.01)
(52) U.S. Cl. .................. 370/358; 370/522; 370/535
(58) Field of Classification Search ............ 370/216, 370/242, 241, 212, 321
See application file for complete search history.

(56) References Cited

U.S. PATENT DOCUMENTS

| | | | | |
|---|---|---|---|---|
| 5,063,564 A | * | 11/1991 | Crandall et al. | 370/522 |
| 5,473,665 A | * | 12/1995 | Hall et al. | 379/27.01 |
| 5,740,241 A | * | 4/1998 | Koenig et al. | 379/399.01 |

OTHER PUBLICATIONS

"Digital Link represents: T-1 fundamentals" Digital Link pp. 32,74.*

* cited by examiner

*Primary Examiner*—Chi H. Pham
*Assistant Examiner*—Soon D. Hyun
(74) *Attorney, Agent, or Firm*—Allen, Dyer, Doppelt, Milbrath & Gilchrist, P.A. Attorneys at Law

(57) ABSTRACT

An alarm indication translation mechanism in a digital access and cross-connect system monitors all incoming tributary DS1 streams for the presence of an alarm indication. Whenever an alarm indication is detected in a fractional tributary DS1 data stream, all DS0 bytes within the T1 stream containing that tributary DS1 data stream include the detected alarm indication. For a Yellow alarm, this means that for the case of D4 superframe format (SF), the second most significant bit of each of the twenty-four bytes of a T1 frame containing at least one fractional DS1 carrying alarm information is set to a '0', irrespective of whether the bytes are valid DS0s or idle bytes. For extended superframe format (ESF), Yellow alarm is transmitted by sending a repetitive sixteen bit pattern consisting of eight marks or '1's, followed by eight spaces or '0's in the data link.

24 Claims, 2 Drawing Sheets

T1 GROOMING TRANSLATION OF YELLOW ALARMS

FIELD OF THE INVENTION

The present invention relates in general to telecommunication systems and subsystems thereof, and is particularly directed to a mechanism for carrying forward alarm indications, such as, but not limited to Yellow alarms, in the course of controllably combining multiple fractional DS1s into a one or more composite (e.g., full frame) T1 data streams.

BACKGROUND OF THE INVENTION

A primary objective of a telecommunication network is to provide as complete a bandwidth usage as possible. To this end, it is common practice to combine or 'groom' partial or fractional DS1s into as few a number of composite T1 data streams as possible, with each T1 data stream preferably being optimally filled with a complete frame of 24 DS0s. By switching only the used data of fractional, tributary DS1 streams into a full occupied network, non-blocking digital access and cross-connect system (DACS) allows for signaling to be maintained through a switching interface. Although this allows DS0 levels of service, such as voice signals, to be maintained through the network, it suffers from the drawback that T1 level alarms, such as Yellow alarms or alarm indication signal (AIS) alarms, are lost or dropped in the course of the translation of timeslots from among different fractional T1 signal streams into a composite output T1 frame. It would be preferred that, along with the signaling information, the alarm information be preserved.

SUMMARY OF THE INVENTION

In accordance with the present invention, this objective is successfully achieved by monitoring all incoming tributary DS1 streams at input ports of the DACs for the presence of an alarm indication. Whenever a tributary DS1 data stream is found to contain alarm information, the resulting composite T1 stream provided at the DACS output port and containing that tributary stream's DS0 data bytes is controllably configured, so that all DS0 bytes within the composite T1 stream contain the detected alarm indication information. In the non-limiting case of a Yellow alarm, for D4(super-frame (SF)) framing format this means that the second most significant bit of each of the twenty-four bytes of a composite T1 frame containing at least one fractional DS1 carrying alarm information is set to a '0', irrespective of whether the bytes are valid DS0s or whether they are idle bytes. For the case of extended superframe-format (ESF), yellow alarm is transmitted by sending a repetitive sixteen bit pattern consisting of eight marks or '1's, followed by eight spaces or '0's in the data link.

DETAILED DESCRIPTION

Figure 1:
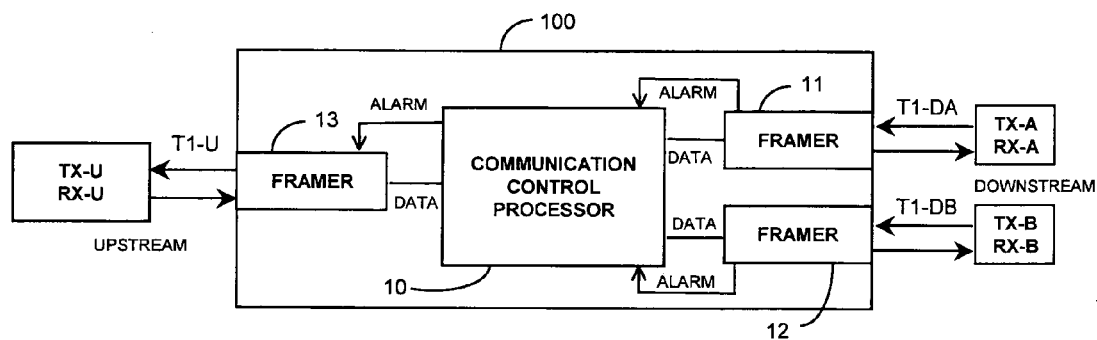
FIG. 1 is a reduced complexity block diagram of a multi-channel T1 framing interface in accordance with the present invention, which is operative to carry forward an alarm indication in any of fractional input T1 signal streams from associated downstream sources as they are combined into a composite output T1 signal stream.

Before detailing the alarm indication translation mechanism in accordance with the present invention, it should be observed that the invention resides primarily in a prescribed arrangement of conventional digital communication circuits and components and attendant supervisory communications microprocessor circuitry, as well as application software therefor, that controls the operations of such circuits and components. Consequently, the configuration of such subsystems and components and the manner in which they may be interfaced with telecommunication channels have, for the most part, been shown in the drawings by readily understandable block diagrams, and composite T1 stream examples, which show only those specific details that are pertinent to the present invention, so as not to obscure the disclosure with details which will be readily apparent to those skilled in the art having the benefit of the description herein. Thus, the block diagrams are primarily intended to show the major components of the invention in convenient functional groupings, whereby the present invention may be more readily understood.

Figure 2:
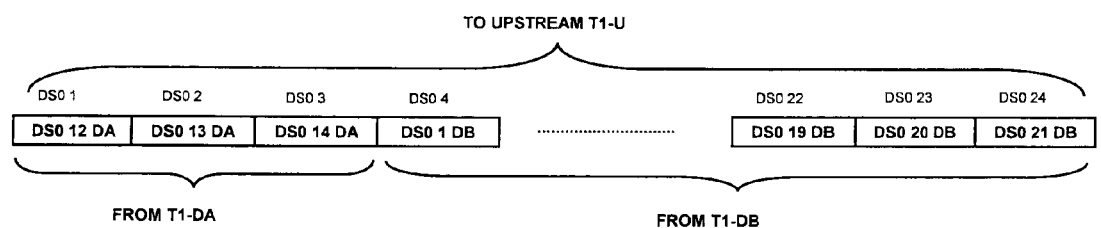
FIG. 2 diagrammatically illustrates a composite alarm condition-containing T1 frame formed of a pair of fractional DS1s produced by the multi-channel T1 framing interface of FIG. 1.

Attention is now directed to FIG. 1, which is a reduced complexity block diagram of a multi-channel framing interface (or digital access and cross-connect system (DACS)) 100, through which multiple fractional input T1 signal streams from associated downstream sources are combined or 'groomed' into a single composite, more fully utilized output T1 signal stream for transport in the upstream direction. A first downstream associated T1 data stream, denoted as T1-DA, is comprised of 3 DS0s, shown in FIG. 2 as three consecutive DS0s: DS0 12 DA, . . . , DS0 14 DA, upstream directed ones of which are transmitted from a downstream transmitter TX-A to a first framer 11, and downstream directed ones of which are transported from the framer 11 to a downstream receiver RX-A. A second downstream associated T1 data stream is denoted as T1-DB and is interfaced with a second framer 12. As shown in FIG. 2, this second fractional T1 stream is comprised of 21 DS0s: DS0 1 DB, . . . , DS0 21 DB, upstream directed ones of which are transmitted from a downstream transmitter TX-B, and downstream directed ones of which are transported to a downstream receiver RX-B. Pursuant to the operation of the multi-channel framing interface 100, the three DS0s in the T1-DA data stream, denoted as occupying DA times slots 12, 13 and 14 are coupled via communications control processor 10 to an upstream framer 13 and sequentially placed in consecutive time slots DS01, DS02 and DS03 of a composite upstream directed T1 data stream T1-U, while the 21 DS0s in the T1-DB data stream are sequentially placed in the remaining consecutive time slots DS0 4, . . . , DS0 24 of the T1 data stream T1-U.

In a conventional DACS, if the transmit path to a downstream source, such as the transmit path for the T1-DA channel, as a non-limiting example, is disrupted, the terminating device will transmit a Yellow alarm. This Yellow alarm is detected at the T1-DA receiver of the framer 11 terminating the incoming T1-DA channel. However, in a conventional cross-connect this alarm condition would not be carried forward by the upstream framer 13 into the outgoing T1-U transmit path of the composite T1 signal containing the T1-DA and T1-DB fractional streams, causing loss of the alarm to upstream devices. The same problem exists for the T1-DB channel.

Figure 3:
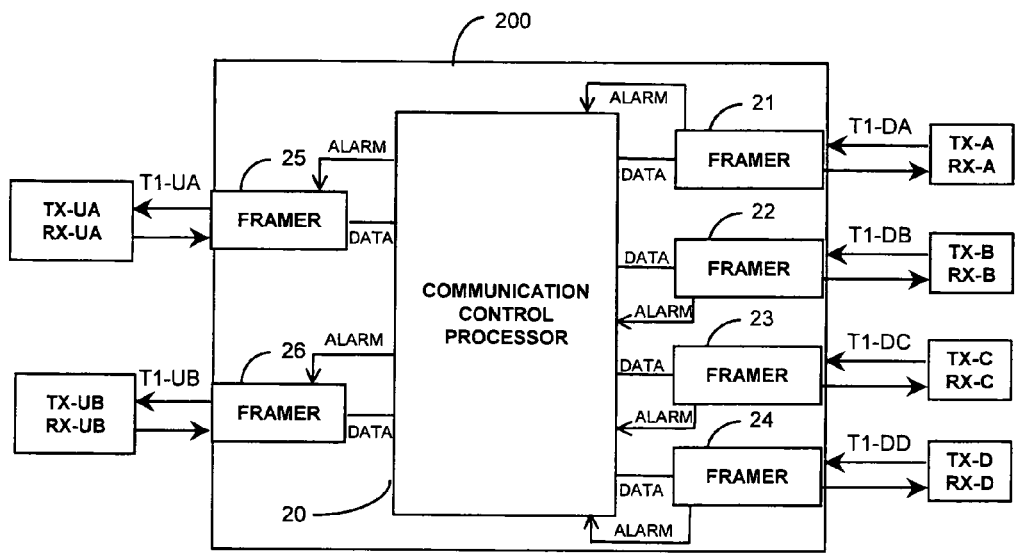
FIG. 3 is a reduced complexity block diagram of a multi-channel framing interface, which is operative to combine selected ones of a plurality of four downstream-sourced fractional T1 signal streams into a pair of outgoing composite upstream data streams, in which an alarm indication in any fractional input T1 signal stream is carried forward into one or more composite output T1 signal streams.
Figure 4:
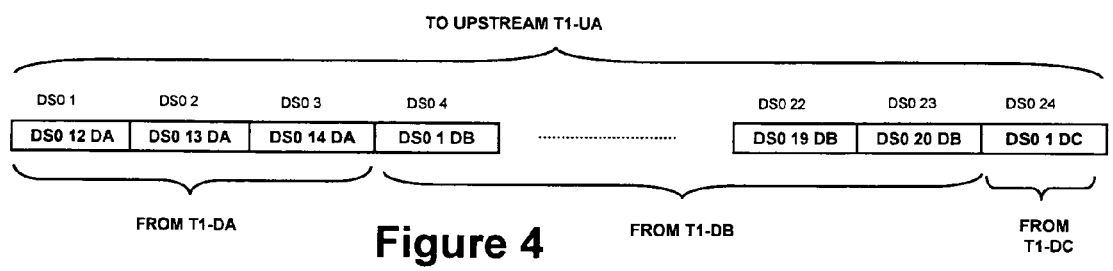
FIGS. 4 and 5 diagrammatically illustrate respective composite alarm condition-containing T1 data streams formed of selected ones of a set of four fractional DS1s produced by the multi-channel T1 framing interface of FIG. 3.
Figure 5:
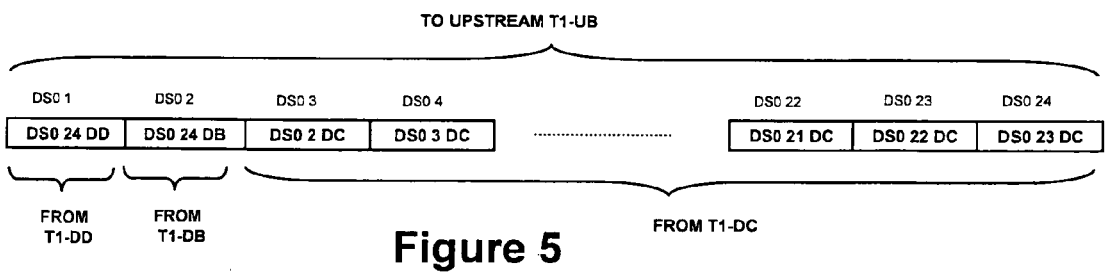

Pursuant to the present invention, however, this problem is remedied by the communications control mechanism employed by communications control processor 10 storing the alarm indication as detected by the framer 11 in the received (fractional) T1 frame and commanding framer 13 to indicate the alarm in the upstream transmit T1 frame. For the case of D4 (SF) framing format the framer 13 forces each time slot of the composite T1-U data stream to contain a Yellow alarm indication, specifically, forcing the second most significant bit of each of the twenty-four time slot bytes of the T1-U data stream to be a '0'. It should be noted that this Yellow alarm bit insertion occurs not only for time slots containing actual data (it just so happens that all twenty-four time slots of the upstream T1-U stream in the present example contain actual data), but also is inserted if the composite T1 frame being output by framer 13 is a fractional data stream (i.e. is less than completely full of DS0s), and contains one or more idle bytes (which are normally all '1'). In this latter situation, any idle byte (1111 1111) in the outgoing T1-U stream will be converted to a Yellow alarm containing idle byte (1011 1111). As pointed out above for the case of extended superframe format (ESF), a yellow alarm is transmitted by sending a repetitive sixteen bit pattern consisting of eight marks or '1's, followed by eight spaces or '0's in the data link If the digital cross-connect is configured to produce multiple upstream T1 data channels from multiple downstream sourced fractional T1 data channels, the same methodology described above with reference to FIGS. 1 and 2 is used, with respect to which fractional T1 streams are mapped into which outgoing T1-U streams. This may be readily understood by reference to FIG. 3, which diagrammatically illustrates a multi-channel framing interface (or digital access and cross-connect system (DACS)) 200, which is operative to combine selected ones of a plurality of four downstream-sourced fractional T1 signal streams T1-DA, T1-DB, T1-DC and T1-DD into a pair of outgoing composite upstream data streams T1-UA and T1-UB. In particular, as shown in FIG. 4, the upstream transmitted composite T1-UA stream produced by a first upstream framer 25 is generated from 3 DS0s (DS0 12 DA, . . . , DS0 14 DA) from the T1-DA channel, supplied to framer 21 20 DS0s (DS0 1 DB, . . . , DS0 20 DB) from the T1-DB channel supplied to framer 22, and one DS0 (DS0 1 DC) from the TL-DC channel supplied to framer 23. As shown in FIG. 5, the other upstream transmitted composite stream TL-UB output by a second upstream framer 26 is generated from one DS0 (DS0 24 DD) from the TL-DD channel, as supplied to framer 24, one DS0 (DS0 24 DB) from the TL-DB channel, as supplied to framer 22 and 22 DS0s (DS0 2 DC, . . . , DS0 23 DC) from the TL-DC channel, as supplied to framer 23.

Should a Yellow alarm indication be detected by a framer for any of channels TL-DA, T1-DB, and TL-DC, the framer will forward the alarm to the communications control processor 20 within multi-channel framing interface 200, which will store the alarm indication and then cause the framer 25 to assert a Yellow alarm in each of the twenty-four time slots of the composite T1-UA stream. Likewise, if a Yellow alarm is detected on any of channels TL-DD, TL-DB, and TL-DC, framer 26 will assert a Yellow alarm in each of the twenty-four time slots of the composite TL-UB stream. It may be noted that in the present example, if a Yellow alarm is detected on either of the downstream sourced TL-DB or TL-DC channels, framers 25 and 26 will insert a Yellow alarm indication in both of the upstream directed T1 streams T1-UA and TL-UB.

As will be appreciated from the foregoing description, the alarm indication translation mechanism in accordance with the present invention is operative to monitor all incoming tributary DS1 streams for the presence of an alarm indication. Whenever an alarm information is detected in a fractional tributary DS1 data stream, all DS0 bytes within the composite T1 stream containing that tributary DS1 data stream include the detected alarm indication information. For the non-limiting case of a Yellow alarm, this means that for the case of D4 (SF) framing format, the second most significant bit of each of the twenty-four bytes of a composite T1 frame containing at least one fractional DS1 carrying alarm information is set to a '0', irrespective of whether the bytes are valid DS0s or whether they are idle bytes. For the case of extended superframe format (ESF), yellow alarm is transmitted by sending a repetitive sixteen bit pattern consisting of eight marks or '1's, followed by eight spaces or '0's in the data link.

While we have shown and described several embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of transporting alarms contained within a fractional digital communication signal frame through a digital access and cross-connect system (DACS), comprising the steps of:
   (a) receiving fractional digital communication signal frames at input ports of said DACS;
   (b) in response to detecting the presence of an alarm indication within a fractional digital communication signal frame received in step (a), storing information representative of said alarm indication; and
   (c) generating at an output port of said DACS a composite digital communication signal frame comprised of multiple fractional digital communication signal frames, as well as an alarm code representative of said alarm indication, wherein in a D4 super framing (SF) format, the second most significant bit of each twenty-four bytes of a composite T1 frame containing at least one fractional DS1 (Digital Signal 1) carrying alarm information is set to a "0," irrespective of whether the bytes are valid DS0s (Digital Signal 0s).

2. The method according to claim 1, wherein step (c) comprises, for D4 superframe format, generating said alarm code in each of said multiple fractional digital communication signal frames.

3. The method according to claim 1, wherein said multiple fractional digital communication signal frames correspond to fractional DS1 frames, and wherein said composite digital communication signal frame comprises a complete T1 frame.

4. The method according to claim 1, wherein said multiple fractional digital communication signal frames correspond to fractional DS1 frames, and wherein said composite digital communication signal frame comprises a T1 frame, which may or may not contain idle DS0 bytes.

5. The method according to claim 1, wherein said alarm indication corresponds to a Yellow alarm.

6. The method according to claim 1, wherein said alarm indication corresponds to an alarm indication signal (AIS) alarm.

7. A method of transporting alarms contained within fractional digital communication signal frames through a digital access and cross-connect system (DACS), comprising the steps of:
(a) receiving multiple fractional digital communication signal frames at multiple input ports of said DACS at least one of which contains an alarm indication;
(b) in response to detecting the presence of said alarm indication within at least one fractional digital communication signal frame received in step (a), storing information representative of said alarm indication; and
(c) generating at plural output ports of said DACS respective composite digital communication signal frames comprised of multiple fractional digital communication signal frames, and wherein at least one of said composite digital communication signal frames contains an alarm code representative of said alarm indication, wherein in a D4super framing (SF) format, the second most significant bit of each twenty-four bytes of a composite T1 frame containing at least one fractional DS1 (Digital Signal 1) carrying alarm information is set to a "0," irrespective of whether the bytes are valid DS0's.

8. The method according to claim 7, wherein step (c) comprises, for D4superframe format, generating said alarm code in each of said multiple fractional digital communication signal frames.

9. The method according to claim 7, wherein said multiple fractional digital communication signal frames correspond to fractional DS1 frames, and wherein said composite digital communication signal frames comprise complete T1 frames.

10. The method according to claim 7, wherein said multiple fractional digital communication signal frames correspond to fractional DS1 frames, and wherein said composite digital communication signal frames comprises T1 frames, which may or may not contain idle DS0 bytes.

11. The method according to claim 7, wherein said alarm indication corresponds to a Yellow alarm.

12. The method according to claim 7, wherein said alarm indication corresponds to an alarm indication signal (AIS) alarm.

13. A digital access and cross-connect system (DACS) that is configured to transport alarms contained within a fractional digital communication signal frame received at an input port thereof in a composite digital communication signal frame produced at an output port thereof, comprising:
(a) a plurality of framers coupled to receive fractional digital communication signal frames at input ports of said DACS;
(b) a memory, which is operative, in response to the presence of an alarm indication within a received fractional digital communication signal frame, to store information representative of said alarm indication; and
(c) a composite communication signal framer coupled to said memory, and being operative to generate, at an output port of said DACS, a composite digital communication signal frame comprised of multiple fractional digital communication signal frames, and containing said alarm indication in each of said multiple fractional digital communication signal frames, wherein in a D4super framing (SF) format, the second most significant bit of each twenty-four bytes of a composite T1 frame containing at least one fractional DS1 (Digital Signal 1) carrying alarm information is set to a "0," irrespective of whether the bytes are valid DS0s (Digital Signal 0s).

14. The DACS according to claim 13, wherein, for D4superframe format, an alarm code is contained in each of said fractional digital communication signal frames.

15. The DACS according to claim 13, wherein said multiple fractional digital communication signal frames correspond to fractional DS1 frames, and wherein said composite digital communication signal frame comprises a complete T1 frame.

16. The DACS according to claim 13, wherein said multiple fractional digital communication signal frames correspond to fractional DS1 frames, and wherein said composite digital communication signal frame comprises a T1 frame, which may or may not contain idle DS0 bytes.

17. The DACS according to claim 13, wherein said alarm indication corresponds to a Yellow alarm.

18. The DACS according to claim 13, wherein said alarm indication corresponds to an alarm indication signal (AIS) alarm.

19. A digital access and cross-connect system (DACS) that is configured to transport alarms contained within one or more fractional digital communication signal frames received at input ports thereof in one or more composite digital communication signal frames produced at output ports thereof, comprising:
(a) a plurality of framers coupled to receive fractional digital communication signal frames at input ports of said DACS;
(b) a memory, which is operative, in response to the presence of an alarm indication within one or more received fractional digital communication signal frames, to store information representative of said alarm indication; and
(c) a plurality of composite communication signal framers coupled to said memory, and being operative to generate, at output ports of said DACS, composite digital communication signal frames comprised of multiple fractional digital communication signal frames, at least one of which composite digital communication signal frames contains an alarm code representative of said alarm indication, wherein in a D4super framing (SF) format, the second most significant bit of each twenty-four bytes of a composite T1 frame containing at least one fractional DS1 (Digital Signal 1) carrying alarm information is set to a "0," irrespective of whether the bytes are valid DS0s (Digital Signal 0s).

20. The DACS according to claim 19, wherein, for D4superframe format, said alarm code is contained in each of said fractional digital communication signal frames.

21. The DACS according to claim 18, wherein said multiple fractional digital communication signal frames correspond to fractional DS1 frames, and wherein said composite digital communication signal frames comprise complete T1 frames.

22. The DACS according to claim 19, wherein said multiple fractional digital communication signal frames correspond to fractional DS1 frames, and wherein said composite digital communication signal frames comprises T1 frames, which may or may not contain idle DS0 bytes.

23. The DACS according to claim 19, wherein said alarm indication corresponds to a Yellow alarm.

24. The DACS according to claim 19, wherein said alarm indication corresponds to an alarm indication signal (AIS) alarm.

* * * * *

UNITED STATES PATENT AND TRADEMARK OFFICE
CERTIFICATE OF CORRECTION

PATENT NO. : 7,512,121 B1
APPLICATION NO. : 11/060866
DATED : March 31, 2009
INVENTOR(S) : Jason N. Morgan and Andrew T. Ruble It is certified that error appears in the above-identified patent and that said Letters Patent is hereby corrected as shown below:

| | |
|---|---|
| Column 3, Line 61 | Delete: "for any of channels TL-DA, T1-DB, and TL-DC, the framer"<br>Insert: -- for any of channels T1-DA, T1-DB, and T1-DC, the framer -- |
| Column 4, Line 1 | Delete: "detected on any of channels TL-DD, TL-DB, and TL-DC,"<br>Insert: -- detected on any of channels T1-DD, T1-DB, and T1-DC, -- |
| Column 4, Line 3 | Delete: "time slots of the composite TL-UB stream. It may be noted"<br>Insert: -- time slots of the composite T1-UB stream. It may be noted -- |
| Column 4, Line 5 | Delete: "either of the downstream sourced TL-DB or TL-DC channels,"<br>Insert: -- either of the downstream sourced T1-DB or T1-DC channels, -- |
| Column 4, Line 7 | Delete: "of the upstream directed T1 streams T1-UA and TL-UB."<br>Insert: -- of the upstream directed T1 streams T1-UA and T1-UB. -- |
| Column 4, Line 56 | Delete: "prises, for D4superframe format, generating said alarm code"<br>Insert: -- prises, for D4 superframe format, generating said alarm code -- |

UNITED STATES PATENT AND TRADEMARK OFFICE
CERTIFICATE OF CORRECTION

PATENT NO. : 7,512,121 B1
APPLICATION NO. : 11/060866
DATED : March 31, 2009
INVENTOR(S) : Jason N. Morgan and Andrew T. Ruble It is certified that error appears in the above-identified patent and that said Letters Patent is hereby corrected as shown below:

| | |
|---|---|
| Column 5, Line 23 | Delete: "a D4super framing (SF) format, the second most signifi-"<br>Insert: -- a D4 superframing (SF) format, the second most signifi- -- |
| Column 5, Line 29 | Delete: "prises, for D4superframe format, generating said alarm code"<br>Insert: -- prises, for D4 superframe format, generating said alarm code -- |
| Column 5, Line 65 | Delete: "D4super framing (SF) format, the second most signifi-"<br>Insert: -- D4 superframing (SF) format, the second most signifi- -- |
| Column 6, Line 5 | Delete: "D4superframe format, an alarm code is contained in each of"<br>Insert: -- D4 superframe format, an alarm code is contained in each of -- |
| Column 6, Line 42 | Delete: "alarm indication, wherein in a D4super framing (SF)"<br>Insert: -- alarm indication, wherein in a D4 superframing (SF) -- |

UNITED STATES PATENT AND TRADEMARK OFFICE
CERTIFICATE OF CORRECTION

PATENT NO. : 7,512,121 B1
APPLICATION NO. : 11/060866
DATED : March 31, 2009
INVENTOR(S) : Jason N. Morgan and Andrew T. Ruble It is certified that error appears in the above-identified patent and that said Letters Patent is hereby corrected as shown below:

Column 6, Line 49      Delete: "D4superframe format, said alarm code is contained in each of"
Insert: -- D4 superframe format, said alarm code is contained in each of --

Signed and Sealed this

Fourteenth Day of July, 2009

JOHN DOLL
*Acting Director of the United States Patent and Trademark Office*